United States Patent [19]

Pyzik et al.

[11] Patent Number: 6,123,797
[45] Date of Patent: Sep. 26, 2000

[54] METHOD FOR COATING A NON-WETTING FLUIDIZABLE AND MATERIAL ONTO A SUBSTRATE

[75] Inventors: Aleksander J. Pyzik, Midland; Jack J. Ott, Hemlock; Harold E. Rossow; Uday V. Deshmukh, both of Midland, all of Mich.

[73] Assignee: The Dow Chemical Company, Midland, Mich.

[21] Appl. No.: 08/494,125

[22] Filed: Jun. 23, 1995

[51] Int. Cl.[7] ....................................... B32B 31/00
[52] U.S. Cl. ..................... 156/279; 156/218; 427/217; 427/203
[58] Field of Search ................... 427/3, 34, 422, 427/423, 424, 157, 217, 203; 164/429

[56] References Cited

U.S. PATENT DOCUMENTS

| | | |
|---|---|---|
| 2,264,152 | 11/1941 | Rowland . |
| 2,902,756 | 9/1959 | Cavanaugh . |
| 3,854,332 | 12/1974 | Smith ......................................... 73/117 |
| 4,108,822 | 8/1978 | Edwards et al. ......................... 260/32.8 |
| 4,163,736 | 8/1979 | Acres et al. . |
| 4,197,104 | 4/1980 | Krystyniak et al. ........................ 65/21 |
| 4,487,157 | 12/1984 | Bergeron et al. .......................... 118/59 |
| 4,521,496 | 6/1985 | Sara . |
| 4,567,825 | 2/1986 | Kanda et al. . |
| 4,588,021 | 5/1986 | Bergeron et al. ........................ 164/432 |
| 4,615,945 | 10/1986 | Iida . |
| 4,657,794 | 4/1987 | Schultze et al. . |
| 4,713,248 | 12/1987 | Kjornes et al. ........................... 424/468 |
| 4,713,284 | 12/1987 | Hasegawa et al. . |
| 4,716,041 | 12/1987 | Kaystyniak et al. ..................... 424/468 |
| 4,789,563 | 12/1988 | Stevens . |
| 4,800,137 | 1/1989 | Okuno et al. . |
| 4,906,512 | 3/1990 | Roess . |
| 4,911,987 | 3/1990 | Sakata et al. . |
| 4,915,902 | 4/1990 | Brupbacker et al. ..................... 420/129 |
| 4,980,239 | 12/1990 | Harada et al. . |
| 5,133,594 | 7/1992 | Haas et al. . |
| 5,165,983 | 11/1992 | Sugiura et al. . |
| 5,217,589 | 6/1993 | Arledge et al. . |

FOREIGN PATENT DOCUMENTS

| | | |
|---|---|---|
| 4342479 | 11/1992 | Japan . |
| 4342481 | 11/1992 | Japan . |
| 4342488 | 11/1992 | Japan . |

*Primary Examiner*—Merrick Dixon

[57] ABSTRACT

A method of coating a fluidizable material onto a surface of a substrate, wherein the substrate is not wettable by the fluidizable material includes depositing a layer of powder particles on the surface of the substrate, the powder particles being wettable by the fluidizable material; contacting the fluidizable material to the layer of powder particles; and allowing the fluidizable material to wick between the powder particles and to contact the surface of the substrate.

The method of the invention provides a method which requires little or no binders or organic solvents, is applicable to many different ceramic-metal formulations, allows easy control of the thickness of the tape, forms fairly dense tapes so that little or no shrinkage occurs upon densification at elevated temperatures, and does not require undesirably high processing temperatures.

11 Claims, 2 Drawing Sheets

METHOD FOR COATING A NON-WETTING FLUIDIZABLE AND MATERIAL ONTO A SUBSTRATE

BACKGROUND OF THE INVENTION

1. Field of the Invention

The present invention relates generally to methods of coating a non-wettable material onto a substrate, methods for making ceramic-metal structures, such as tapes, methods for bonding two ceramic bodies together, and, structures formed by the methods.

2. Description of the Related Art

With today's increasing needs for improved materials, there are often instances when it would be desirable to have a material with properties of a metal, such as toughness, deformability, electrical conductivity, heat conductivity, and welding capability, and the strength and rigidity of a ceramic. One way of achieving such a hybrid material would be to layer a metal and a ceramic by coating a metal onto a ceramic substrate. The resulting layered material could be used to make conventional devices, but since the material would combine the advantages of a metal with a ceramic, the device could be made smaller, thus, lighter, than devices made of previous materials and yet remain efficacious for the intended use.

However, it is often found that a chosen metal does not coat well onto a chosen ceramic because the wetting properties between the chosen metal and ceramic are not conducive for wetting.

It would also be desirable to coat a nonwettable metal onto a ceramic substrate and resulting in a minimal amount of metal oxide in the layered product, as metal oxides are often detrimental to conductivity and strength.

There are also countless other instances when it is difficult to coat a material, whether the material be solid or liquid at room temperature, onto a substrate of choice because the wetting characteristics between the material to be coated and the substrate material are not conducive for wetting.

In the more specific field of making ceramiemetal tapes, the most common method used is a tape casting technique. This technique often requires a high content of binders in the casted tape, which is undesirable because the binders are frequently difficult to remove. The tape casting technique also often requires the use of organic solvents in order to cast the tapes. However, the use of organic solvents is not environmentally desirable.

Another problem with current tape casting techniques is that developing the formulations suitable for both the ceramic and the metal powders is not an easy task. In addition, it is difficult to control the thickness of tapes formed by current techniques. A further problem with current tape casting techniques is that tapes that are formed are porous and shrink in all dimensions upon densification at elevated temperatures and typically require undesirably high temperatures for processing.

In the ceramics industry, there is also a need for improved ways of bonding two ceramic bodies together. Often, two ceramic bodies are bonded together with another ceramic. The thus-formed ceramic joint has good strength, but once the joint fails, it fails in a catastrophic manner. When a metal joint is used to bond two ceramic bodies together, the metal joint typically has a lower strength than a ceramic joint, but is capable of deforming with slow crack propagation and, therefore, has less catastrophic failure than a ceramic joint. Therefore, it is desirable to have a way of bonding two ceramic bodies together which has the advantage of the high strength of a ceramic joint as well as the characteristically less catastrophic failure of a metal joint.

It is, therefore, one object of the present invention to provide a structure of a non-wettable material on a solid substrate and a method for making same.

It is yet another object of the present invention to provide a method for making ceramic-metal structures, such as tapes, which method requires little or no binders or organic solvents, is applicable to many different ceramic-metal formulations, allows easy control of the thickness of the tape, forms fairly dense tapes so that little or no shrinkage occurs upon densification at elevated temperatures, and does not require undesirably high processing temperatures.

It is still another object of the present invention to provide a structure of two ceramic bodies bonded together having high bond strength and slow crack propagation and a method of bonding the two ceramic bodies together.

SUMMARY OF THE INVENTION

To achieve the foregoing objects, one aspect of the present invention is a method of coating a nonwetting fluidizable material onto a surface of a substrate wherein the substrate is not wettable or only poorly wettable by the non-wetting fluidizable material. The method includes (a) depositing a layer of powder particles on the surface of the substrate, wherein the powder particles are wettable by the non-wetting fluidizable material; (b) contacting the non-wetting fluidizable material to the layer of powder particles; and (c) allowing the non-wetting fluidizable material to wick between the powder particles in the layer and to contact the surface of the substrate, thereby coating the surface of the substrate with the non-wettable fluidizable material.

More specifically, the non-wetting fluidizable material may be formed of organic fluids, inorganic fluids, polymeric materials, glass, or metal, the substrate may be formed of metal, glass, ceramic, or composites of ceramic and metal, and the powder particles may be formed of metal, ceramic, or mixtures thereof. Preferably, the powder particles are deposited in a layer having a thickness of from about 1 to about 25 micrometers and a porosity of from about 50 to about 90%, and the powder particles have an average particle size of from about 0.1 micrometers to about 50 micrometers. Advantageously, the non-wetting fluidizable material coating may contact at least about 50 of the surface of the substrate which was covered by the layer of powder particles.

The layered structure formed from the method described immediately above includes a solid substrate, a non-wetting fluidizable material coating adhered onto a surface of the solid substrate, and powder particles dispersed in the coating of the non-wetting fluidizable material. Preferably, in the layered structure, the nonwetting fluidizable material is substantially continuously coated onto the surface of the solid substrate. The term "substantially continuously coated", as used herein, is used to mean that the non-wetting fluidizable material contacts at least about 50% of the surface of the solid substrate upon which it is coated.

Another aspect of the present invention is a method for making a ceramic-metal tape. The method includes (a) depositing a layer of a non-wettable ceramic powder onto a solid form; (b) depositing a layer of a wettable powder onto the layer of the non-wettable ceramic powder; (c) contacting a metal to the layer of the wettable powder; (d) heating the metal to a temperature in which the metal melts and wicks through the layer of the wettable powder and around the individual particles of the wettable powder contacting the layer of the non-wettable ceramic powder to form a metal-infiltrated structure, and (e) cooling the metalinfiltrated structure to solidify the metal, thereby
forming a ceramic-metal tape on the solid form. In this aspect, the non-wettable ceramic powder is not wettable by the molten metal and the wettable powder is wettable by the molten metal.

The ceramic-metal tapes, thus formed, may be layered together and the layered structure may be heated to a temperature which causes the layered ceramic-metal tapes to bond together and form a ceramic-metal structure.

Yet another aspect of the present invention is a method for bonding ceramic bodies together. The method includes (a) coating a surface of a first ceramic body with non-reactive powder particles and reactive powder particles; (b) abutting a surface of a second ceramic body against the coated surface of the first ceramic body; (c) contacting the coating between the first ceramic body and the second ceramic body with a metal, (d) heating the metal to a temperature for a sufficient period of time so that the metal infiltrates through the powder particle coating, around the individual powder particles, and contacts the two ceramic bodies; and (e) cooling the infiltrated metal until the metal solidifies, thereby bonding the two ceramic bodies together. The non-reactive powder particles are non-reactive with the infiltrating metal, and the reactive powder particles are reactive with the infiltrating metal.

The layered structure formed from the method described immediately above includes (a) a first ceramic body; (b) a metal-infiltrated layer bonded to the first ceramic body; and (c) a second ceramic body bonded to the
metal-infiltrated layer. The metal-infiltrated layer contains reactive material, non-reactive material, and metal, wherein the reactive material is reactive to the metal and the non-reactive material is non-reactive to the metal.

Other objects, features, and advantages of the present invention will be readily appreciated as the same becomes better understood after reading the subsequent description taken in conjunction with the appendant drawings.

DESCRIPTION OF THE PREFERRED EMBODIMENTS

The First Embodiment

Figure 1:
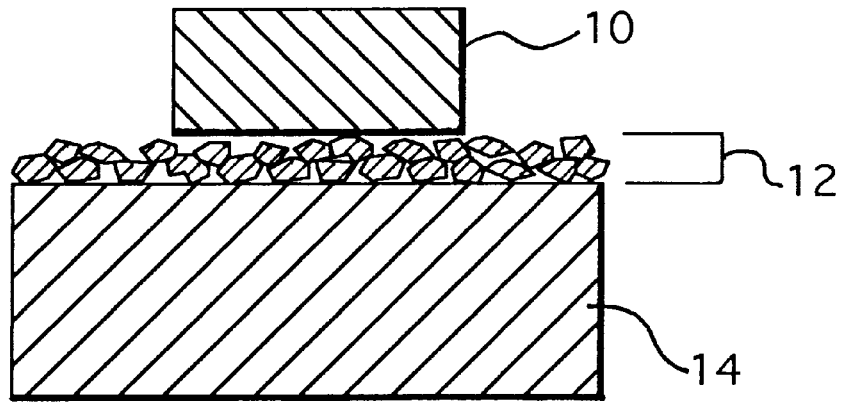
FIG. 1 illustrates a step in the method of one embodiment of the present invention in which a fluidizable material is contacted to a layer of powder particles which has been deposited onto a substrate.

The first embodiment of the present invention is a method for coating a non-wetting fluidizable material on a substrate which is not wettable or only poorly wettable by the non-wetting fluidizable material. The method generally includes the steps of (a) depositing a layer of powder particles which are wettable by the non-wetting fluidizable material onto a surface of the substrate, (b) contacting the fluidizable material to the layer of powder particles, and (c) allowing the fluidizable material to wick between the powder particles and to contact the surface of the substrate, thereby forming a substantially continuous coating on the substrate.

The substrate may have any shape and may be formed of, e.g., metal, glass, ceramic, or a ceramiemetal composite. Exemplary ceramics which may form the substrate include AlN, SiC, $AlO_3$, $Si_3N_4$, and $B_4C$. The substrate may be formed by any suitable technique, such as, slip casting, pressing, tape density substrate is required, greenware may be densified by techniques such as sintering, hot pressing, hot isostatic pressing, or infiltrating metal into the substrate.

The fluidizable material to be coated may be any fluidizable material, that is, any material which is or may be made fluid, e.g., by melting. If the fluidizable material to be coated is meltable, the meltable material should melt at a temperature lower than the temperature at which the substrate or the powder particles melt or extensively react with each other. It is preferred that the coating of the fluidizable material be capable of adhering to the substrate either by chemical or physical interaction.

Specific examples of the fluidizable material are organic or inorganic fluids, glass, polymeric materials, and metals, including metal alloys. Polymeric materials include thermoplastics and polymeric fluids. Exemplary metals include aluminum, copper, magnesium, cobalt, iron, molybdenum, and nickel. An exemplary metal alloy is molybdenum-nickel.

The first embodiment method of the present invention provides the ability of coating a liquid onto a solid when the liquid and solid are characterized by non-wetting behavior. One can determine whether or not a material (A) is wettable or not wettable by material (B) in a particular atmosphere by measuring the contact angle of a liquid or fluidized drop of material (B) on a dense body of material (A) in the chosen atmosphere. If material (B) is solid at room temperature, then material (B) must be heated to its melting point to measure the contact angle. The contact angle is the angle between the liquid-gas interface and the liquid-solid interface.

Material (A) is considered wettable by material (B) if the contact angle is less than 90°. When a wettable combination is desired it is preferred that the contact angle be less than 45° and, more preferably, less than 25°. Material (A) is considered not wettable by material (B) if the contact angle is equal to or greater than 90°.

The powder particles to be deposited onto the surface of the substrate must be wettable by the fluidizable material. The composition of the powder particles is chosen such that, when the fluidizable material is fluidized and contacted with the layer of powder particles, the fluidizable material flows between the powder particles due to capillary action. The powder particles do not have to be capable of chemically or mechanically bonding to the substrate. Often, it is desired that the powder particles do not bond or bond only weakly to the substrate after being subjected to the conditions of the method of the present invention.

Exemplary materials which may constitute the powder particles include metals, ceramics, and mixtures thereof. Some examples of combinations of substances for the powder particles and fluidizable materials include: W and Cu, Ti and Mg, WC and Co, TiC and Co, WC and Fe, $MOSi_2$ and Al, TiC and Mo, $B_4C$ and Al, $TiB_2$ and Al, TiC and Al, $SiB_4$ and Al, $TiB_2$ and Ni, and TiC and Mo—Ni.

It is preferred that the powder particles have a particle size of from about 0.1 to about 50 micrometers, more preferably, from about 1 to about 25 micrometers, and, most preferably, from about 1 to about 5 micrometers.

The powder particles may be deposited on the surface of the substrate by many techniques. For example, the powder particles may be dispersed in a liquid and deposited, e.g., by spraying, brushing, or printing. Printing techniques allow the powder particles to be deposited in a pattern on the substrate. One can also use techniques such as chemical vapor deposition, plasma-enhanced deposition, ion beam sputtering, etc. If the powder particles are deposited as a dispersion, the layer of powder particles is preferably dried before infiltrating the metal.

It is preferred that the powder particles be deposited on the substrate to a dry thickness of from about 1 to about 500 micrometers, more preferably, from about 3 to about 150 micrometers, and, most preferably, from about 5 to about 100 micrometers. Typically, the powder particles are deposited from one to about 20 monolayers thick, preferably, at least two monolayers thick.

The layer of dried powder particles preferably has a porosity of from about 50 to about 90%, more preferably, from about 60 to about 80%, and, most preferably, from about 70 to about 80%. Due to the porosity of the powder particle layer, the powder particle layer is discontinuous along the surface of the substrate.

Once the substrate has a dry powder-particle layer thereon, the powder-particle layer is contacted with the fluidizable material either by placing the fluidizable material directly on the powder-particle layer or by merely touching a portion of the powderparticle layer with the fluidizable material.

FIG. 1 illustrates this step of the method, wherein a block of fluidizable material 10 (shown as being metal) is resting on a layer 12 of powder particles (also shown as being metal) which have been deposited on a surface of a substrate 14. As illustrated, the layer 12 of powder particles is porous and contacts the substrate 14 discontinuously.

If the fluidizable material is fluid at room temperature, the fluidizable material will wick between and around the powder particles, eventually being forced to contact the substrate surface. In addition, it is desirable that the fluidizable material be capable of flowing under the powder particles adjacent to the substrate surface, thus, increasing the amount of contact area between the fluidizable material and the substrate. The increase of contact area helps to improve adhesion of the fluidizable material coating to the substrate.

If the fluidizable material is solid at room temperature, the fluidizable material is heated to an elevated temperature and for a sufficient period of time so that the fluidizable material melts and wicks between the powder particles and preferably between at least some of the powder particles and the substrate surface.

The heating of the fluidizable material is typically conducted under vacuum.

At the completion of the wicking of the fluidizable material, the fluidizable material preferably flows around the powder particles and contacts at least about 50%, more preferably, at least about 80%, most preferably, at least about 95%, of the substrate surface that was originally deposited with the powder particles. As a result of the coating of the fluidizable material on the substrate surface, the powder-particle layer remains discontinuous on or does not contact the substrate surface. The resulting fluidizable-material coating consists substantially of isolated powder particles surrounded by a continuous layer of the fluidizable material. The fluidizable material is in direct contact with the surface of the substrate which is otherwise not wettable by the fluidizable material. Identical experiments conducted without the layer of powder particles results in the lack of a continuous coating on the substrate, because, due to the poor wetting of the fluidizable material on the substrate, the fluidizable material is unable to spread out on the substrate.

Figure 2:
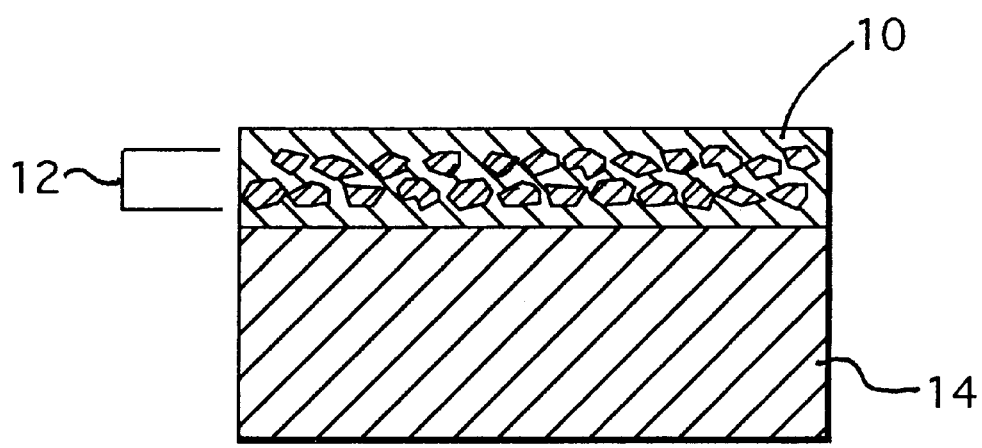
FIG. 2 shows the layered structure formed by the method partially illustrated in FIG. 1.

FIG. 2 illustrates the layered structure formed by the method of the first embodiment of the present invention. Metal 10 has infiltrated into layer 12 of the powder particles and around the individual powder particles until it has continuous contact with the surface of substrate 14.

The content of the powder particles in the powder particle/fluidizable material composite layer may typically be from about 5 to about 25 weight percent based on the weight of the composite layer.

If the fluidizable material is a metal, one advantage of this method is that the resulting substratecoating interface has a minimal amount of undesirable metal oxide present. The present method results in a low amount of metal oxide at the substrate-fluidizable material interface, because, during the coating procedure, the liquid metal is mobile and leaves behind an oxidized surface layer as it infiltrates into the powder particle layer. Therefore the interface is free from surface oxides which are typically present in products made by other methods which use metal foils or particles. Having a fresh, clean metal surface in contact with the substrate surface helps to increase the chemical diffusion between the metal and the substrate, thus, improving adhesion and bonding between the two.

The metal-infiltrated layer of the layered structure may be used as a heat conductor, an electrical conductor, a toughening barrier, or a welding zone, or it may be reacted or oxidized to form a chemically- and/or mechanically-protective layer.

The Second Embodiment

The second embodiment of the present invention is a method for making a ceramic-metal tape. The method includes the steps of (a) depositing a layer of a nonwettable ceramic powder onto a shaped solid form; (b) depositing a layer of a wettable powder onto the layer of the non-wettable ceramic powder; (c) contacting a metal to the layer of the wettable powder; (d) heating the metal to a temperature in which the metal wicks between the particles of the layer of the wettable powder and contacts the layer of the non-wettable ceramic powder to form a metal-infiltrated structure, and (e) cooling the metal-infiltrated structure to solidify the metal and form a ceramic-metal tape on the solid form. The nonwettable ceramic powder stops metal flow which allows the tape to be separated from the solid form when infiltration and cooling is completed.

The method of the second embodiment employs the method of the first embodiment. In the first embodiment, a fluidizable material is allowed to wick between and around powder particles on a surface of a substrate. In the second embodiment, the fluidizable material is molten metal and the substrate is a solid form having a layer of non-wettable ceramic powder thereon.

The solid form used in the second embodiment of the present invention may be flat-surfaced or contoured and is typically formed of ceramic. If the solid form is to be used as a mold surface and subsequently removed, then the solid form is preferably formed of a material which is non-bonding to the non-wettable ceramic powder after being subjected to the conditions (temperature and pressure) of the method. It is also preferred that, if the solid form is to be removed, the solid form be formed of a material which is not wettable by the particular metal in the method.

If the solid form is to remain a part of the final structure, then it is preferred that the solid form be formed of a material which bonds to the non-wettable ceramic powder upon being subjected to the conditions (temperature and pressure) of the second embodiment of the present invention.

The bonding, non-bonding, and wettable interactions between the solid form and the other materials may be determined empirically.

As mentioned, the non-wettable ceramic powder is not-wettable by the metal to be used in the method. The definition of non-wettable is the same as that discussed for the first embodiment of the present invention. The non-wettable ceramic powder is present to act as a barrier layer, keeping the metal from contacting the solid form.

Preferably, the non-wettable ceramic powder has a particle size of from about 0.01 to about 100 micrometers, more preferably, from about 0.01 to about 10 micrometers, and, most preferably, from about 0.01 to about 1 micrometer.

The non-wettable ceramic powder layer may be deposited by the same techniques as suggested for the powder particles of the first embodiment of the present invention discussed above. If the non-wettable ceramic powder layer is applied as a dispersion, the layer is allowed to dry.

It is preferred that the dry layer of the nonwettable ceramic powder have a thickness of from about 0.1 to about 100 micrometers, more preferably, from about 1 to about 50 micrometers, and, most preferably, from about 1 to about 25 micrometers. Typically, the nonwettable ceramic powder layer is from about 1 to about 10 monolayers thick.

It is preferred that the dry layer of the nonwettable ceramic powder have a porosity of from about 40 to about 80%, more preferably, from about 40 to about 70%, and, most preferably, from about 40 to about 60%.

As mentioned hereinabove, the wettable powder particles are wettable by the metal to be wicked therebetween. The definition of wettable and the preferred contact angles are the same as those discussed for the first embodiment of the present invention. The composition of the wettable powder is chosen such that, when the metal is molten and contacted with the wettable powder, the molten metal flows between the particles of the wettable powder due to capillary action. The wettable powder does not have to be capable of chemically or mechanically bonding to the substrate. Typically, the wettable powder is formed of ceramic or metal.

The wettable powder may be deposited by the same techniques as described for coating the powder particles in the first embodiment of the present invention.

The preferred particle size of the wettable powder and the preferred properties of the wettable powder layer, such as thickness and porosity, depends on the tape properties desired. Typically, the particle size of the wettable powder is from about 0.1 to about 50 micrometers, the solid content of the wettable powder layer is from about 10 to about 50% (i.e., the porosity of the wettable powder layer is from about 50 to about 90%), and the tape thickness ranges from about 5 to about 1000 micrometers.

The metal to be wicked between the particles of wettable powder may be an elemental metal, an alloy, or mixtures thereof. To wick the metal between the particles, the metal is first contacted to the wettable powder layer. The method of contact is not important. For example, the metal may be placed entirely on the wettable powder layer or it may merely be contacted to a portion of the wettable powder layer.

Figure 3:
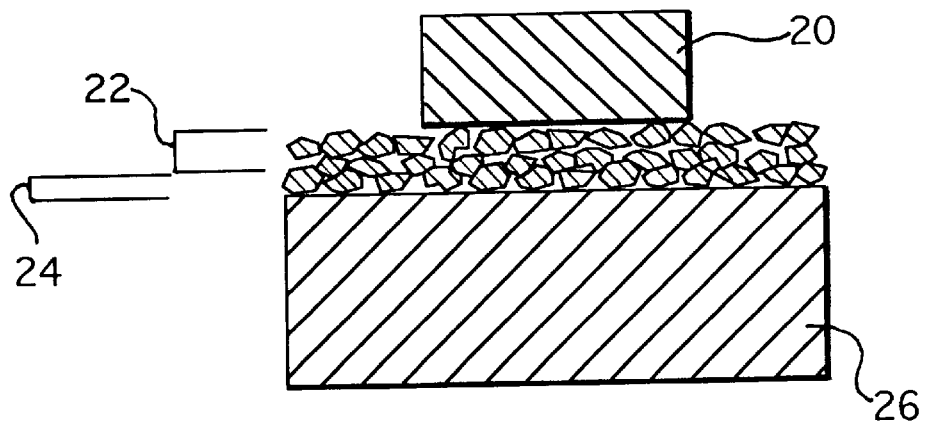
FIG. 3 illustrates a step in the method of another embodiment of the present invention in which a metal is contacted to a layer of wettable powders on a ceramic form.

FIG. 3 illustrates contacting the metal to the coating of wettable powder in which metal 20 is resting on coating 22 of a wettable powder which has been deposited on coating 24 of a non-wettable powder which, in turn, has been deposited on ceramic form 26.

Figure 4:
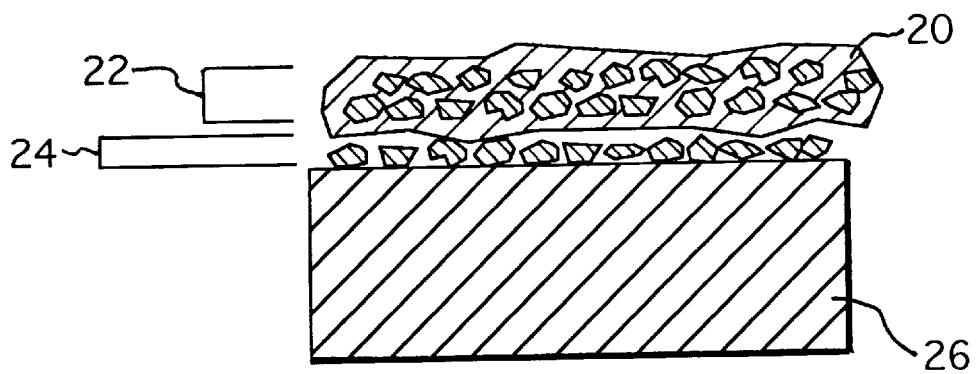
FIG. 4 illustrates another step in the method of the embodiment shown in FIG. 3.

After contacting the metal to the wettable powder, the metal is heated to a temperature in which the metal wicks between and around the particles of wettable powder until the metal contacts the non-wettable ceramic powder, as shown in FIG. 4. The metal does not generally wick between the particles of the non-wettable ceramic powder. The heating step of the second embodiment is typically conducted under vacuum or in an inert gas atmosphere.

Figure 5:
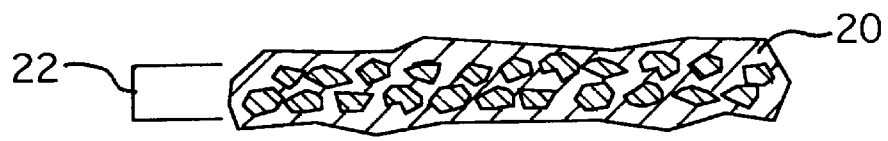
FIG. 5 shows a ceramic-metal tape formed from the method illustrated in FIGS. 3 and 4.

After heating the metal and allowing it to wick between the particles, as desired, the layered structure which includes the solid form, the layer of non-wettable ceramic powder deposited on the surface of the solid form, the layer of wettable powder surrounded by a continuous matrix of metal, is allowed to cool to solidify the metal. When the compositions of the solid form and the non-wettable ceramic powder are chosen so that the two do not bond together during the method, the solid form may be removed from the remainder of the structure which consists of a layered structure with one layer consisting of non-wettable ceramic and a second layer consisting of wettable powder infiltrated with metal. The layer of non-wettable ceramic powder can be easily removed from the layer of wettable powder infiltrated with metal by several techniques including mechanical grinding or brushing. The wettable powder infiltrated with metal may be considered a ceramic-metal tape, which is shown in FIG. 5.

The amount of ceramic in the ceramic-metal tape depends on the method of depositing the ceramic powder and the particle size of the ceramic powder, but can typically vary from about 10 to about 50 weight percent based on the weight of the tape.

The thus-formed ceramic-metal tape typically has a density which is at least about 95% of the theoretical maximum density. Depending on the shape of the solid form, the tape may be flat or have complex geometries.

The thus-formed ceramic-metal tapes may be layered together and the layered tapes may be heated to a temperature which causes the tapes to bond together. The temperature for bonding may be a metal deformation temperature which is below the melting temperature of the metal but is high enough to render the metal deformable under pressure. In another fashion, the temperature for bonding two tapes together may be the diffusion sintering temperature in which the temperature is high enough to cause the diffusion of the metal into the adjoining ceramic layer. The layering of the ceramic-metal tapes may involve two or more layers and may involve layers of different composition.

Exemplary combinations of materials in which the solid form may be removed after the heating step are shown in the following table.

| Combination | Ceramic Form | Non-Wettable Powder | Wettable Powder | Metal |
| --- | --- | --- | --- | --- |
| I | AlN | AlN | $TiB_2$ | Al |
| II | AlN | AlN | $B_4C$ | Al |
| III | AlN | AlN | TiC | Mo-Ni |
| IV | $Al_2O_3$ | $Si_3N_4$ | WC | Co |
| V | $Al_2O_3$ | AlN | $TiB_2$ | Al |
| VI | $Al_2O_3$ | AlN | $Al_2O_3$ | Nd |
| VII | AlN | $B_4C$ | W | Cu |

Single tapes and composites of several tapes formed by the method of the second embodiment of the present invention can be used in the electronic industry for electronic substrates and hard disk drive components. The tapes and composites may also be used for structural applications, such as lightweight automotive brakes, robotic arms, and clutches.

The Third Embodiment

The third embodiment of the present invention is generally a method for bonding ceramic bodies together using a reactive powder, a non-reactive powder, and a metal. The method includes first coating a surface of a first ceramic body with reactive powder particles and non-reactive powder particles. Optionally, a surface of a second ceramic body may also be coated. The reactive powder particles are chemically reactive with the particular metal selected, and the non-reactive powder particles are chemically non-reactive with the selected metal. A surface of a second ceramic body is then abutted against the coated surface of the first ceramic body. The coating between the two ceramic bodies defines the bonding zone. The coating between the first ceramic body and the second ceramic body is then contacted with the metal, and the metal is heated to a temperature for a sufficient period of time so that the metal is caused to wick and infiltrate through the coating and around the individual particles of the coating, finally contacting the two ceramic bodies. When the metal is allowed to cool and solidify, the two ceramic bodies are bonded together.

The ceramic bodies to be bonded together may be formed of ceramic, having little or no free metal, or they may be formed of a ceramic-metal composite. The ceramic bodies may be of any size or shape. The ceramic bodies may be wettable or non-wettable by the infiltrating metal. Additionally, the ceramic bodies may be chemically reactive or chemically non-reactive with the infiltrating metal.

As stated, the reactive powder particles are chemically reactive with the metal to be infiltrated into the bonding zone. That is, the reactive powder particles, used in the present invention, are those which form new material phases with the infiltrating metal. In contrast, the non-reactive powder particles, used in the present invention, are those which do not form new material phases with the infiltrating metal.

Both the reactive and the non-reactive powder particles must be wettable by the infiltrating metal according to the definition for wettable provided above for the first embodiment of the present invention. The preferred contact angles discussed above also apply in this third embodiment of the present invention.

The reactive and non-reactive powder particles preferably have a particle size of from about 0.1 to about 10 micrometers and, more preferably, from about 0.5 to about 5 micrometers. Typically, the reactive and the non-reactive powder particles are ceramic or ceramic mixtures.

Coating the reactive and non-reactive powder particles onto the ceramic body or bodies may be done in any of several ways. For one way of coating, two ceramic bodies may be coated initially with a layer of reactive powder particles and thereafter coated with a layer of non-reactive powder particles. The two bodies may then be abutted at their coated surfaces for bonding them together. In this way of coating, it is preferred that the layers of reactive powder particles have a thickness of from about 0.5 to about 15 micrometers, more preferably, from about 1 to about 5 micrometers, and the two layers of non-reactive powder particles have a total thickness of from about 1 to about 50 micrometers, more preferably, from about 1 to about 10 micrometers. The layers of non-reactive powder particles individually preferably have a thickness of from about 0.5 to about 25 micrometers, and, more preferably, from about 0.5 to about 5 micrometers.

For a second way of coating, a first ceramic body may be coated initially with a layer of the reactive powder particles and thereafter coated with a layer of the non-reactive powder particles, and a second ceramic body may be coated with a layer of the reactive powder particles only. The two bodies may then be abutted at their coated surfaces for bonding them together. In this way of coating, it is preferred that each of the layers of reactive powder particles have a thickness of from about 0.5 to about 15 micrometers, more preferably, from about 1 to about 5 micrometers, and the layer of nonreactive powder particles have a thickness of from about 1 to about 25 micrometers.

As a third way of coating, a first ceramic body may be coated initially with a layer of reactive powder particles and thereafter coated with a layer of a mixture of reactive powder particles and non-reactive powder particles, and a second ceramic body may be coated with a layer of reactive powder particles only. The two bodies may then be abutted at their coated surfaces for bonding them together. The mixture of reactive and nonreactive powder particles may have various ratios of reactive powder particles to non-reactive powder particles depending on the bonding characteristics desired. Preferably, the ratio of reactive powder particles to non-reactive powder particles is from about 75:25 to about 25:75 and, more preferably, from about 50:50 to about 25:75. In this way of coating, it is preferred that each of the layers of reactive powder particles have a thickness of from about 1 to about 10 micrometers, more preferably, from about 1 to about 5 micrometers, and the layer of the mixture of reactive and non-reactive powder particles have a thickness of from about 5 to about 50 micrometers, more preferably, from about 10 to about 20 micrometers.

As a fourth but less preferred way of coating, a first ceramic body may be coated with a layer of a mixture of reactive powder particles and non-reactive powder particles. The mixture preferably has a ratio of reactive powder particles to non-reactive powder particles of from about 75:25 to about 25:75 and, more preferably, from about 50:50 to about 25:75. A second ceramic body may then be abutted against the coated surface of the first ceramic body for bonding the two bodies together. In this way of coating, it is preferred that the layer of the mixture of reactive and nonreactive powder particles have a thickness of from about 1 to about 50 micrometers, more preferably, from about 5 to about 20 micrometers.

The layers of reactive powder particles preferably have a porosity of from about 50 to about 90% and, more preferably, from about 75 to about 85%. The layers of non-reactive powder particles preferably have a porosity of from about 60 to about 90%, and, more preferably, from about 70 to about 85%. The layers of the mixtures of reactive and non-reactive powder particles preferably have a porosity of from about 50 to about 90% and, and more preferably, from about 70 to about 85%.

The reactive and non-reactive powder particles may be coated on the ceramic bodies by many techniques. For example, the powder particles may be dispersed in water and deposited, e.g., by spraying, brushing, or printing. One can also use techniques such as chemical vapor deposition, plasma-enhanced deposition, ion beam sputtering, etc. If the powder particles are deposited as a dispersion, the layer of powder particles is preferably dried before infiltrating the metal.

Once the reactive and non-reactive powder particles have been coated onto the appropriate ceramic bodies, the ceramic bodies are abutted together at the surfaces to be bonded. The coating between the first ceramic body and the second ceramic body is then contacted with a metal. The metal may be an elemental metal or metal alloy. The contacting step may be accomplished, e.g., by placing the metal between coated surfaces or by merely contacting an exterior portion of the powder particle coating.

The contacted metal is then heated to a temperature for a sufficient period of time so that the metal wicks through the coating and around the individual particles of the coating, finally contacting the two ceramic bodies. During the heating step, the metal infiltrates into the bonding zone but does not need to infiltrate into the ceramic bodies. If the ceramic bodies are dense and/or non-wettable by the metal, the metal will generally not infiltrate into the ceramic bodies.

Usually it is preferred to merely contact a portion of the periphery of the powder particle coatings with the infiltrating metal because the technique of drawing the metal into the bonding zone from the periphery minimizes the amount of metal oxide in the final bonded product, as moving molten metal carries minimal amount of metal oxide. In contrast, when the metal, and its accompanying metal oxide, is sandwiched with the coatings, the metal oxide remains a part of the final bonded product.

Typically, when the metal is aluminum or an aluminum alloy, the temperature for wicking is from about 1000° C. to about 1200° C. and the sufficient period of time is from about 5 to about 45 minutes. Preferably, the heating step is conducted under vacuum. Alternatively, an atmosphere of inert gas may be used.

After the heating step, the ceramic body structure is cooled, typically to room temperature, thereby solidifying the metal and bonding the ceramic bodies together. After cooling, the bonded ceramic bodies may be heat-treated by heating them to at most about 800° C.

An exemplary combination of materials which may be used in the third embodiment is: $B_4C/Al$ as the material forming the ceramic bodies, $B_4C$ powder as the reactive powder particles, $TiB_2$ powder as the nonreactive powder particles, and aluminum or aluminum alloy as the metal. In this combination, the ceramic bodies ($B_4C/Al$) are considered wettable by the metal (aluminum or aluminum alloy).

An alternative combination of materials for the third embodiment is the same as the combination immediately above except that the ceramic bodies are formed of aluminum nitride. In this combination, the ceramic bodies (AlN) are considered not wettable by the metal (aluminum or aluminum alloy).

The product, thus formed, is a layered structure which includes a first ceramic body, a metalinfiltrated layer bonded to the first ceramic body, and a second ceramic body also bonded to the metalinfiltrated layer. The metal-infiltrated layer contains reactive material, non-reactive material, and the infiltrated metal. The reactive material is formed from the reactive powder particles and the infiltrated metal, and the non-reactive material is formed from the nonreactive powder particles.

Depending on the method of coating the reactive and non-reactive powder particles, the metal-infiltrated layer of the layered structure may have different material gradients. For instance, if reactive powder particles are deposited onto the ceramic bodies first, then the metal-infiltrated layer will have a higher level of reactive material relative to non-reactive material near the ceramic bodies. This portion having a higher level of reactive material may be referred to as a reactive-material-rich layer. The reactive-material- rich layer, when present, may be from about 0.5 to about 100 micrometers, but is preferably from about 0.5 to about 15 micrometers thick.

In the layered structure, the material formed by the reactive powder particles provides strong bonding and interfacial strength, the metal provides a ductile path for crack propagation, and the material formed by the non-reactive powder particles provides a barrier to reaction. A crack in the layered structure will typically begin at the brittle interface, which is formed by the reactive powder particles and the metal. The crack is then forced to propagate through the weaker, yet more ductile, layer of the non-reactive powder particles/metal composite and behaves similar to a crack in metal.

Advantages of bonding two ceramic bodies together using the method of the third embodiment are that one has better control of the interfacial strength and the type of fracture that will typically occur. In addition, the bonded product will have a blend of the positive attributes of a ceramic and the positive attributes of a metal.

Accordingly, the present invention provides novel structures formed of non-wettable materials coated on a solid substrate which is normally not wettable by the non-wettable materials and methods for making same. The present invention also provides a method for making ceramic-metal structures, such as tapes, which requires little or no binders or organic solvents, is applicable to many different ceramic-metal formulations, allows easy control of the thickness of the tape, forms fairly dense tapes so that little or no shrinkage occurs upon sintering, and does not require undesirably high processing temperatures. In addition, the present invention provides a structure of two ceramic bodies bonded together having high bond strength and slow crack propagation and methods of forming such structures.

The following examples are illustrative only and should not be construed as limiting the invention which is properly delineated in the appended claims.

For the examples, contact angles of various metals on various substrates were measured. Dense substrates of AlN, $B_4C$, $Si_3N_4$, $TiB_2$, and W were polished to a 1 micron surface finish. 0.5-gram samples of various metals were placed on a 1 $cm^2$ area of the finished surfaces. The metal/substrate set-ups were placed in a furnace equipped with tungsten heating elements, telescope viewing of the set-ups, and photography equipment capable of photographing the set-ups. After placing the set-ups in the furnace, the furnace interior was maintained under a $10^{-4}$ torr vacuum and heated to 1200° C. at a rate of 20° C./minute. The contact angles of the metals on the substrates were measured from photographs taken of the set-ups after being maintained at 1200° C. for 10 minutes. The contact angles of the metals on the substrates are shown in the following table. The first three combinations show unwetting behavior, and the last three combinations show wetting behavior.

| Substrate | Metal | Contact Angle |
|---|---|---|
| AlN | Al | 130° |
| $B_4C$ | Cu | 135° |
| $Si_3N_4$ | Al | 105° |
| $TiB_2$ | Al | 25° |
| $B_4C$ | Al | 20° |
| W | Cu | 10° |

EXAMPLES

Examples Illustrating the First Embodiment

Example 1

Boron carbide powder, produced by Elektroschemeltzwerk Kempten, Munich, Germany, specification 1500, having an average particle size of about 3 micrometers, was baked in an argon atmosphere at 1400° C. to passivate the surface of the boron carbide and render it chemically-compatible with aluminum. The baked boron carbide was dispersed to a 25 weight percent solids in water having a pH of 7, controlled with addition of $NH_4OH$.

A surface of an AlN substrate was spray coated with the dispersion of the boron carbide powder in the shape of a tree having three branches extending from a trunk. The spray-coating on the AlN substrate was then allowed to dry. The spray-coating had a thickness of about 10 micrometers. Aluminum metal was contacted with the spray-coating at the bottom of the tree trunk, and the aluminum-contacted AlN substrate was then heated to 1160° C. under vacuum. The temperature was held at 1160° C. for 12 minutes. Even though molten metal does not typically wet aluminum nitride, in this experiment, the entire tree-shaped boron carbide-coated surface had a thin layer of aluminum well bonded to the aluminum nitride. A polished cross-section of the coated substrate showed a substantially continuous layer of boron carbide-aluminum composite bonded to the aluminum nitride substrate. It was observed that the direct contact area of the aluminum with the aluminum nitride was higher than 75%.

Example 2

Titanium boride powder, produced by Herman Starok of Germany, having an average particle size of about 4 micrometers was dispersed in methanol to a solids content of 25 weight percent. A block of hot-pressed silicon nitride was spray coated with the titanium boride dispersion. The layer of titanium boride was then allowed to dry and had a dry thickness of about 150 micrometers. Aluminum metal was placed in contact with the titanium boride layer, and the structure was heated 540° C. per hour to 1160° C. under vacuum, and the temperature was held at 1160° C. for 30 minutes. Normally, aluminum does not wet silicon nitride and the contact angle below 1200° C. is higher than 90°. However, in this experiment, aluminum wetted most of the silicon nitride, leaving only spots which had not been coated with enough titanium boride. It was observed that the direct contact area of the aluminum with the silicon nitride was about 80%.

Example 3

A slurry of tungsten powder was prepared by dispersing tungsten powder, having an average particle size of about 1 to 3 micrometers, in heptane to a percent solids of 15 weight percent.

Two hot-pressed boron carbide substrates were machined smooth on one surface each. The first boron carbide substrate was sprayed on its machined surface with the tungsten powder slurry. The tungsten coating was then allowed to dry and had a thickness of about 25 micrometers. The machined surface of the second boron carbide substrate was not coated with tungsten. Copper metal was then placed on top of each of the boron carbide substrates, and the structures were heated to and held at 1160° C. for 30 minutes. The copper on the tungsten-coated boron carbide surface formed a hemisphere with a contact angle of about 600 at 1160° C. and wetted the boron carbide. In contrast, the copper on the uncoated boron carbide surface formed a sphere with a contact angle of about 1350 at 1160° C. and did not wet the boron carbide.

Example #4

A slurry of titanium boride powder was prepared in methanol to a weight percent solids of 20 weight percent. The titanium boride powder used had an average particle size of about 4 micrometers. Two substrates of aluminum nitride were spray-coated on one side each with the titanium boride slurry. The titanium boride coatings were then allowed to dry and had a thickness of about 10–25 micrometers. The two coated substrates of aluminum nitride were then sandwiched together so that the titanium boride layers were placed in direct contact with one another. The AlN-$TiB_2$-AlN sandwich was then contacted with aluminum at the TiB2 coatings and heated to 1160° C. At 1160° C., molten aluminum infiltrated the porous $TiB_2$ layer forming a strong interfacial bond between the aluminum-$TiB_2$ and the AlN.

Examples Illustrating the Second Embodiment

Example #5

Slurries of aluminum nitride powder and of titanium boride powder were prepared in methanol to a percent solids of 25 weight percent. An aluminum nitride substrate was spray-coated with the slurries so that the aluminum nitride substrate had one layer of aluminum nitride powder and two layers of titanium boride powder on top of the layer of aluminum nitride powder. The aluminum nitride powder had a particle size of about 3 to 4 micrometers, and the titanium boride powder had a particle size of about 4 to 6 micrometers. The coated substrate was dried. The thickness of the dried aluminum nitride layer was about 10 micrometers, and the total thickness of the dried titanium boride layers was about 125 micrometers. The titanium boride layers were contacted with aluminum, and the structure was heated to and held at 1160° C. for 18 minutes under vacuum. At 1160° C., molten aluminum infiltrated the titanium boride layers forming a thin, flat tape on top of the aluminum nitride-coated aluminum nitride substrate, the tape having a thickness of 140–180 micrometers. The aluminum metal did not penetrate the aluminum nitride powder layer. As a result, the aluminum did not bond to the aluminum nitride substrate. The tape had a titanium boride content of about 20 volume percent. The titanium boride/aluminum tape easily peeled away from the aluminum nitride substrate.

Example #6

A slurry of aluminum nitride powder was prepared in methanol, and a slurry of boron carbide powder was prepared in water having a pH of 7 controlled with addition of $NH_4OH$. The aluminum nitride powder had an average particle size of about 1 micrometer, and the boron carbide powder had an average particle size of about 3 micrometers. An aluminum nitride substrate was spray-coated first with the slurry of aluminum nitride powder and afterward with the boron carbide powder. The coated aluminum nitride substrate was then dried. The dried coatings had a total dry thickness of about 180 micrometers. The boron carbide powder layer was contacted with aluminum and the structure was then heated to and held at 1160° C. for 30 minutes under vacuum. After cooling, the boron carbide/aluminum tape separated from the aluminum nitride substrate due to the difference in thermal expansion between the tape and the substrate. The tape had a thickness of 160–200 micrometers, and the ceramic content of the tape was about 15 to 20 weight percent.

Examples Illustrating the Third Embodiment

In Examples 7–7C, the tensile strengths of the interface between the ceramic bodies were measured by tensile tests using using an Instron, Model 1125, with a cross-head speed of 0.002 inches/minute and a load cell of 10,000 pounds. The results were determined from displacement vs. load curves which were generated during the tensile tests.

Example #7

A surface of each of two dense bodies of $B_4C/Al$ were sprayed initially with a layer of B4C powder as the reactive powder and thereafter sprayed with a layer of $TiB_2$ powder as the non-reactive powder. Both the $B_4C$ and the $TiB_2$ powders were sprayed as dispersions in methanol. The $B_4C$ powder had an average particle size of about 3 micrometers. The coated layers were then dried. The dried layer of $B_4C$ powder was about 10 micrometers thick and had a density of about 20% theoretical density (i.e, a porosity of about 80%). The $TiB_2$ powder had an average particle size of about 6 micrometers. The dried layer of $TiB_2$ powder was about 20 micrometers thick and had a density of about 25% theoretical density (i.e., a porosity of about 75%). The density (or the porosity) of the powder layers were estimated after infiltration of the metal, as discussed below.

Aluminum foil was then sandwiched between the two coated surfaces of the ceramic bodies. The sandwiched ceramic bodies were then exposed to a temperature of 1160° C. for 15 minutes to allow the aluminum to infiltrate and to bond the two ceramic bodies together. The resulting strength of the bond was measured to be about 1830 psi at which point a crack initiated in the brittle layer, B—C—Al, of the bonding zone. The crack did not propagate through the $B_4C$-$B_4C/Al$ interface, but through the $TiB_2$/Al—Al interface. The crack propagated in a ductile manner as demonstrated by the displacement vs. load results from the tensile test.

The densities (or the corresponding porosities) of the powder layers on the ceramic bodies were determined by observing a cross section of the metalbonded ceramic bodies and determining the surface area of the powder and the metal. The densities of the powder layers (in percent) were calculated by dividing the surface area of the metal by the total surface area of the metal/powder composite and multiplying by 100. On the other hand, the porosities of the powder layers (in percent) were calculated by dividing the surface area of the powder by the total surface area of the metal/powder composite and multiplying by 100.

Comparative Example #7A

Aluminum foil was sandwiched between two dense bodies of $B_4C/Al$, and the sandwich structure was exposed to 1160° C. for 15 minutes. The resulting strength of the bond was measured to be about 350–375 psi.

Comparative Example #7B

Two dense bodies of $B_4C/Al$ were placed together at flat surfaces, and aluminum foil was contacted to the periphery of the joined surfaces. The structure was then exposed to 1160° C. for 15 minutes. There was no aluminum penetration into the interface between the two bodies. As a result, no bond was obtained between the two bodies.

Comparative Example #7C

A surface of each of two dense bodies of $B_4C/Al$ were sprayed with a layer of $TiB_2$ as a non-reactive powder having an average particle size of about 6 micrometers. The layer of $TiB_2$ was about 20 micrometers thick and had a density of from about 20 to about 25% theoretical density (i.e., from about 75 to about 80% porosity). The coated surfaces of the dense bodies were then abutted, and aluminum was contacted to the periphery of the abutting surfaces. The structure was then exposed to a temperature of 1160° C. for 15 minutes, the aluminum flowed into the coating due to capillary action, and the dense bodies were bonded together. The resulting strength of the interface was measured to be about 1800 psi at which point a crack initiated in the bonding zone. The crack propagated spontaneously through the ceramiccermet ($TiB_2$-$B_4C/Al$) interface. The crack propagated in a typical brittle manner as demonstrated by the displacement vs. load results from the tensile test.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A method of coating a non-wetting fluidizable material onto a surface of a substrate, the substrate being not wettable by the non-wetting fluidizable material, the method comprising:

(a) depositing a layer of powder particles on the surface of the substrate, the powder particles being wettable by the non-wetting fluidizable material;

(b) contacting the non-wetting fluidizable material to the layer of powder particles; and (c) allowing the non-wetting fluidizable material to wick between the powder particles in the layer and to contact the surface of the substrate, thereby coating the surface of the substrate with the non-wettable fluidizable material.

2. The method of claim 1, wherein the nonwetting fluidizable material is a meltable material and the method further comprises heating the meltable material while in contact with the layer of powder particles, the heating being performed to an elevated temperature and for a sufficient period of time so that the meltable material wicks between the powder particles.

3. The method of claim 1, wherein the substrate is formed of a substance selected from the group consisting of metal, glass, ceramics, and composites of ceramic and metal.

4. The method of claim 1, wherein the powder particles are formed of a substance selected from the group consisting of metals, ceramics, and mixtures thereof.

5. The method of claim 1, wherein the layer of powder particles has a thickness of from about 1 to about 500 micrometers thick.

6. The method of claim 1, wherein the powder particles have an average particle size of from about 0.1 micrometers to about 50 micrometers.

7. The method of claim 1, wherein the layer of powder particles has a porosity of from about 50 to about 90%.

8. The method of claim 1, wherein the nonwetting fluidizable material is selected from the group consisting of organic fluids, inorganic fluids, polymeric materials, glass, and metals.

9. The method of claim 1, wherein the contact angle between the non-wetting fluidizable material, when fluidized, and a dense body of the substance forming the powder particles is less than 45°.

10. The method of claim 1, wherein the nonwetting fluidizable material contacts at least about 50% of the surface of the substrate upon which the nonwetting fluidizable material is coated.

11. A method of coating a non-wetting metal onto a surface of a ceramic substrate, the ceramic substrate being not wettable by the non-wetting metal, the method comprising:

(a) depositing a layer of powder particles on the surface of the ceramic substrate to a thickness of from about 1 to about 500 micrometers and a porosity of from about 50 to about 90%, the powder particles being wettable by the non-wetting metal, having an average particle size of from about 0.1 micrometers to about 50 micrometers, and being formed of a substance selected from the group consisting of metals, ceramics, and mixtures thereof;

(b) contacting the non-wetting metal to the layer of powder particles; and (c) heating the non-wetting metal while in contact with the layer of powder particles, the heating being performed to an elevated temperature and for a sufficient period of time so that the non-wetting metal wicks between the powder particles and contacts the surface of the ceramic substrate, thereby coating the surface of the ceramic substrate with the non-wettable metal and the non-wetting metal contacts at least about 50% of the surface of the substrate which was covered by the layer of powder particles.

* * * * *